July 7, 1925.
R. RADFORD ET AL
1,545,455
MOLD FOR MAKING MEDICINAL CAPSULES
Filed May 19, 1923
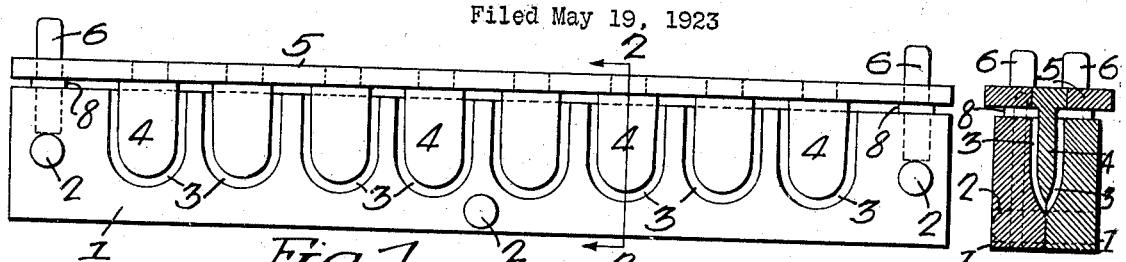
Fig. 1.
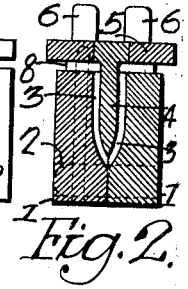
Fig. 2.
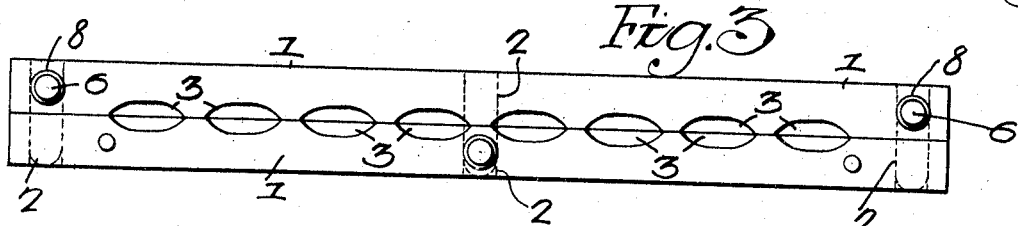
Fig. 3.
Fig. 6.
Fig. 4.
Fig. 5.
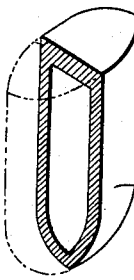
Fig. 7.
Inventors
Robert Radford,
Claude P. Brown.
by their Attorneys
Howson & Howson Patented July 7, 1925.

1,545,455

UNITED STATES PATENT OFFICE.

ROBERT RADFORD AND CLAUDE P. BROWN, OF PHILADELPHIA, PENNSYLVANIA.

MOLD FOR MAKING MEDICINAL CAPSULES.

Application filed May 19, 1923. Serial No. 640,101.

*To all whom it may concern:*

Be it known that we, ROBERT RADFORD and CLAUDE P. BROWN, citizens of the United States, residing in Philadelphia, Pennsylvania, have invented Molds for Making Medicinal Capsules, of which the following is a specification.

One object of this invention is to provide a relatively simple, convenient and inexpensive device particularly designed for use in the manufacture of capsules containing liquid or solid substances, and the invention more especially contemplates a device whereby it shall be possible to mold, fill and seal capsules with the utmost speed and at a minimum of cost.

These objects and other advantageous ends we attain as hereinafter set forth reference being had to the accompanying drawings, in which, Fig. 1 is a side elevation of one section of a capsule mold showing the plungers in position therein;

Fig. 2 is a transverse vertical section on the line 2—2, Fig. 1;

Fig. 3 is a plan of the top face of mold;

Fig. 4 is a perspective view of the plungers with their supporting plate;

Fig. 5 is a perspective view of the top plates for use in sealing the capsules;

Fig. 6 is a fragmentary elevation of the mold showing one of the top plates positioned thereon and illustrating filled capsules in vertical section;

Fig. 7 is a perspective view, partly in section, illustrating one of the capsules made by our invention.

In the above drawings, 1—1 represents two elongated bars usually of rectangular cross section and similar in dimensions, separably held together by dowel pins 2—2 and having formed in them a series of cavities 3—3 extending downwardly from their top faces. One half of each cavity is preferably formed in each of said mold members 1 and the cavities have the form which it is desired the main portions of the finished capsules shall possess;—being in the present instance, as indicated at *x* in Fig. 7 of flattened elongated form preferably pointed or tapered at one end and substantially flat at the opposite end.

For forming hollows or cavities in the capsules, we provide a series of plungers 4—4 fixed to and projecting from a plate 5 and of the shape and dimensions which it is desired the hollow or cavity of each capsule shall possess. Mounted on the mold members 1—1 and projecting upwardly from their top faces are a number of guide pins 6 designed to fit holes 7 in the plate 5 so as to properly position the various plungers or blades 4—4 within the respective recesses of said mold. It is noted that the guide pins 6 are enlarged or have collars 8 immediately above the top surfaces of the mold 1—1, so that when the plate 5 is applied to them, its lower face is spaced a definite distance above the top of the mold, while its plungers 4 are properly positioned within the recesses 3—3.

In utilizing this part of our invention, we place together the two mold sections 1—1, as shown in Fig. 2, and fill the various recesses 3—3 with a melted material from which it is desired to make the bodies of the capsules, for example a suitable wax or other substance such as gelatine may be employed. Before this material solidifies, we insert the various plungers 4—4 in their recesses 3—3 in positions and to depths determined by the pins 6—6 and collars 8 thereon as shown in Fig. 2;—any surplus material escaping between the top of the mold sections 1—1 and the plate 5. When the wax or other material in the mold recesses has reached proper consistency, the plate 5 with its plungers is removed and the cavities formed by the removal of the plungers from the various capsule bodies are filled with any desired medicinal or other material.

Thereafter the filled capsule bodies are sealed and for this purpose, we preferably provide a pair of similar plates 10—10 having holes 11 for the reception of the collars 8 of the guide pins 6. The adjacent edges of these plates are recessed to form openings preferably corresponding in size and position with the openings into the recesses 3 of the mold, and after properly positioning said plates, we pour into or fill their several recesses with the material of which the capsule bodies are made, so that the otherwise open top of each of said bodies is closed and sealed by said material, which it will be understood, is at such a temperature as to properly unite with the top edges of said bodies. When this material last introduced has hardened, the plates 10—10 are removed and the mold sections 1—1 are separated so as to allow the filled capsules to be easily withdrawn or removed. Said capsules then have the structure shown at x in Fig. 7.

From the above description, it will be appreciated that by means of the relatively simple and substantial device above described, we are enable to make and fill large numbers of capsules in a relatively short time and it is to be particularly noted that capsules so made are regular and uniform both as to their shape and disposition of material. Moreover, the filling and sealing the capsules can be accomplished with the utmost speed, accuracy and convenience.

We claim:

1. The combination in a capsule mold of a structure having cavities for the reception of material forming capsule bodies; plungers for forming hollows in the capsule bodies formed in said cavities; and a structure for application to the top of the mold having recesses aligned with the mold cavities for reception of material forming closures for the filled capsule bodies in the mold.

2. The combination of a capsule mold having cavities for the reception of material forming capsule bodies; plungers for indenting the material in said cavities to define the hollows of the capsule bodies; and two plates removably mounted on the mold having their adjacent edges recessed to form openings in substantial alignment with the cavities of the mold for the reception of material for closing the capsule bodies after they have been filled.

ROBERT RADFORD.
CLAUDE P. BROWN.